No. 710,439. Patented Oct. 7, 1902.
U. E. DICE.
BALL AND SOCKET FASTENING.
(Application filed July 10, 1901.)
(No Model.)

Witnesses
Thos. E. French
George W. Alfred

Inventor
Urban Ephraim Dice,
by Finckel & Finckel
his Attorneys

THE NORRIS PETERS CO., PHOTO-LITHO., WASHINGTON, D. C.

UNITED STATES PATENT OFFICE.

URBAN E. DICE, OF COLUMBUS, OHIO.

BALL-AND-SOCKET FASTENING.

SPECIFICATION forming part of Letters Patent No. 710,439, dated October 7, 1902.

Application filed July 10, 1901. Serial No. 67,767. (No model.)

*To all whom it may concern:*

Be it known that I, URBAN EPHRAIM DICE, a citizen of the United States, residing at Columbus, in the county of Franklin and State of Ohio, have invented certain new and useful Improvements in Ball-and-Socket Fastenings; and I do hereby declare the following to be a full, clear, and exact description of the invention, such as will enable others skilled in the art to which it appertains to make and use the same.

The object of this invention is to provide an improved ball-and-socket fastening that shall be of simple, durable, and economical construction, of easy and speedy manipulation, and not liable to accidental separation.

In my drawings herewith I have illustrated the application of my invention to corsets; but obviously the invention can be used on belts, gloves, or other articles where parts are to be temporarily held together.

The invention consists in the peculiar construction of parts hereinafter described and claimed.

Figure 1:
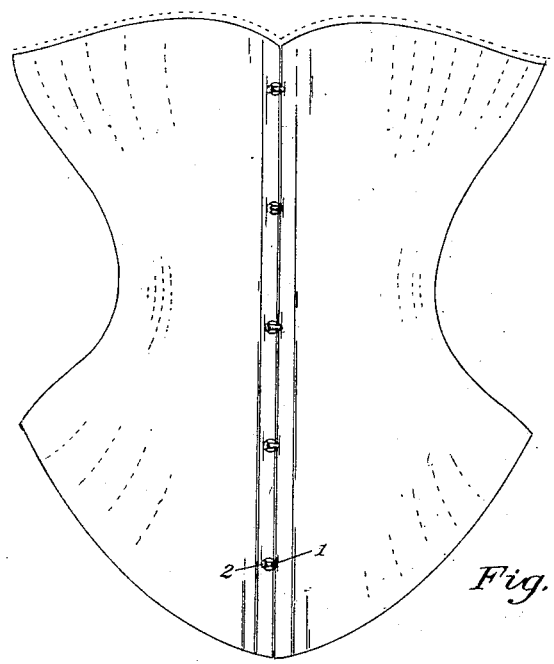
Figure 2:
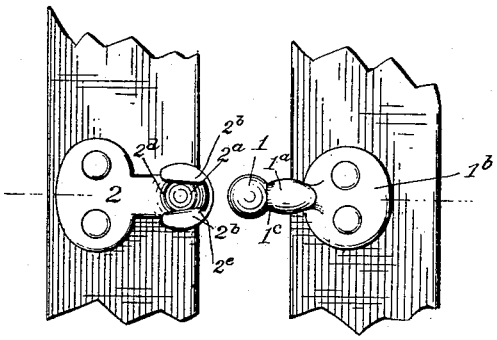
Figure 4:
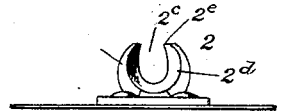
Figure 3:
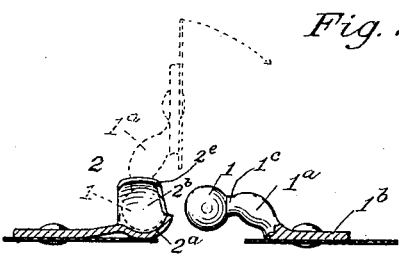

In the drawings referred to, Figure 1 is a view of the front of a corset, showing the fastening applied thereto. Fig. 2 is a view of a single ball and socket on a large scale, the parts being separated. Fig. 3 is a sectional view of the same, the broken lines indicating the mode of effecting the connection. Fig. 4 is a view of the outer end of the socket.

In the several views, 1 designates the ball portion, which is shown to be of spherical form and provided with a rigid shank $1^a$. This shank is shown to be of gooseneck form and slightly thickened or enlarged along its middle portion, thereby forming a groove $1^c$ adjacent the ball portion for the purpose to be hereinafter explained. The shank of the ball portion has a fastening-plate $1^b$, that can be secured to the stay of the corset by means of rivets passed through both the plate and the stay to hold them together.

The socket portion 2 and its shank are indicated to be shaped or formed out of a single piece of sheet metal. The socket proper is shown to be concavous—that is, it has a rounded bottom $2^a$ and upwardly rising therefrom symmetrically-concaved and slightly-elastic wings $2^b$ to form a spherical cavity closely fitting and inclosing the sides of the ball portion. These wings are of such form as to leave a free opening at the outer end, permitting the insertion of the ball, and also to form a narrow slot or opening $2^c$ at the top extending into the inner end of the socket portion. The slot is of such transverse diameter as to permit the passage of the shank of the ball portion, but not of the ball portion itself, which is to be inserted from the outer end or through the opening at $2^d$. The upper edges of the wings $2^b$ where they form the slot converge at the points $2^e$, so that the shank of the ball portion when drawn through or turned down in the opening $2^c$ tends to slightly spring the points $2^e$ asunder, and when the shank of the ball portion is down it will be locked against ordinary tendencies to lift it; but I do not at this time regard this as an indispensible feature of the construction. The socket portion can be fastened to the stay by a fastening-plate like that on the shank of the ball portion. When the middle portion of the shank $1^a$ of the ball is enlarged, as hereinbefore stated, the groove $1^c$ is engaged by the edges of the wings $2^b$ at the inner end of the socket, thereby preventing undue longitudinal movement of the shank or ball in the socket when the parts are engaged. The fact that the socket portion is shaped to conform closely to the ball portion insures good frictional contact between the parts when united and aids in preventing undue looseness and accidental separation. Moreover, the socket portion can be made small and sightly.

When the parts are to be hooked together and the shank $1^a$ is short, it will be expeditious, even if not necessary, to tilt the shank and ball outward, as indicated by broken lines, Fig. 3, preparatory to inserting the ball in the socket, and when the ball has reached its seat the shank is drawn downward to its fastened position. The ordinary tension on the parts of a corset, belt, or other article of apparel serves to keep the parts of the fastening together, and an intentional effort will be necessary to effect their separation.

Where a group of the devices is employed and arranged in line on single stays—as, for example, in a corset—the entire series of balls and sockets can be connected or separated by a single manipulation of the stays.

It will be observed that with the construction shown and described when the ball is within the socket it is inclosed, so that things cannot catch under it to tend to lift or pull it out, and that because the shank of the ball portion passes through or lies in the opening at the inner end of the socket portion the ball directly engages the socket, and the pull or draft is therefore directly between the ball portion and the socket.

When I speak in my claims of the "inner" end of the socket portion, I refer to that end next the stay or part bearing the shank of the ball portion, and of course the outer end of the socket will be that opposite this end, or that end through which the ball is inserted.

What I claim, and desire to secure by Letters Patent, is—

1. In combination with parts to be connected, a ball-and-socket device for fastening the same, comprising on one part a rigid shank and ball portion, and on the other part a spherical concavous socket portion to inclose the sides of the ball portion, said socket portion being open at its outer end to admit the ball portion, a slot in the top of said socket portion extending into the inner end of the socket portion, said slot permitting the passage of the shank of the ball portion, but not the separation of the ball portion by removal through the top of the socket portion, said shank when the parts are connected passing through the inner end of the slot, substantially as described.

2. In combination with parts to be connected, a fastening device therefor, comprising a rigid shank and ball portion, a sphere-like concavous socket portion to inclose the sides of the ball portion, said socket portion being open at its outer end to admit the ball portion, a slot in the top of said socket portion extending into the inner end of the socket portion and of smaller width than the diameter of the ball portion, whereby the removal of the ball portion through the top of the socket portion is prevented, and elastic points in the slot normally separated by a distance less than the diameter of the shank portion to prevent accidental lifting of the shank when extending through the inner end of the slot, substantially as described.

3. In combination with parts to be connected, a ball-and-socket fastening device therefor, comprising a ball portion, a rigid shank therefor having an annular groove adjacent the ball portion, and a socket portion open at its outer end to admit the ball, and having a slot in its top extending into the inner end of said socket portion, and permitting the passage of the shank of the ball portion, the wall of the slot engaging the groove in the shank of the ball portion when the parts are connected to prevent longitudinal movement of the shank with respect to the socket portion, substantially as described.

In testimony whereof I affix my signature in presence of two witnesses.

URBAN E. DICE.

Witnesses:
O. W. ALDRICH,
GEO. M. FINCKEL.